US012694278B2

(12) United States Patent
Huang et al.

(10) Patent No.: US 12,694,278 B2
(45) Date of Patent: Jul. 28, 2026

(54) HARDWARE ACCELERATION FRAMEWORK FOR GRAPH NEURAL NETWORK QUANTIZATION

(71) Applicant: Alibaba (China) Co., Ltd., Hangzhou (CN)

(72) Inventors: Linyong Huang, Hangzhou (CN); Zhe Zhang, Beijing (CN); Shuangchen Li, Sunnyvale, CA (US); Hongzhong Zheng, Los Gatos, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 927 days.

(21) Appl. No.: 17/899,557

(22) Filed: Aug. 30, 2022

(65) Prior Publication Data

US 2024/0005133 A1 Jan. 4, 2024

(30) Foreign Application Priority Data

Jul. 1, 2022 (CN) .......................... 202210773928.8

(51) Int. Cl.
*G06N 3/063* (2023.01)
*G06F 16/901* (2019.01)
(Continued)

(52) U.S. Cl.
CPC ......... *G06N 3/063* (2013.01); *G06F 16/9014* (2019.01); *G06N 3/04* (2013.01); *G06N 3/08* (2013.01); *G06N 20/10* (2019.01)

(58) Field of Classification Search
CPC .......... G06N 3/063; G06N 3/04; G06N 20/10; G06N 3/0495; G06N 3/08; G06F 16/9014
See application file for complete search history.

(56) References Cited

U.S. PATENT DOCUMENTS 6,701,021 B1 * 3/2004 Qian ...................... G06T 9/008
382/253
7,454,341 B1 * 11/2008 Pan ...................... G10L 15/063
704/256.4

(Continued)

OTHER PUBLICATIONS

Wang et al., "Binarized Graph Neural Network," Apr. 19, 2020.
(Continued)

*Primary Examiner* — Mariela Reyes
*Assistant Examiner* — Skieler Alexander Kowalik
(74) *Attorney, Agent, or Firm* — Sheppard Mullin Richter & Hampton LLP

(57) ABSTRACT

This application describes an hardware and a software design for quantization in GNN computation. An exemplary method may include: receiving a graph comprising a plurality of nodes respectively represented by a plurality of feature vectors; segmenting the plurality of feature vectors into a plurality of sub-vectors and grouping the plurality of sub-vectors into a plurality of groups of sub-vectors; performing vector clustering on each of the plurality of groups of sub-vectors to generate a plurality of centroids as a codebook; encoding each of the plurality of feature vectors to obtain a plurality of index maps by quantizing sub-vectors within the each feature vector based on the codebook, wherein each index map occupies a smaller storage space than the each feature vector does; and storing the plurality of index maps as an assignment table instead of the plurality of feature vectors to represent the plurality of nodes for GNN computation.

18 Claims, 11 Drawing Sheets

(51) Int. Cl.

| | |
|---|---|
| *G06N 3/04* | (2023.01) |
| *G06N 3/08* | (2023.01) |
| *G06N 20/10* | (2019.01) |

(56) References Cited

U.S. PATENT DOCUMENTS

| | | | |
|---|---|---|---|
| 9,516,325 | B2 | 12/2016 | Carlsson et al. |
| 10,381,020 | B2 | 8/2019 | Ramprashad |
| 10,503,270 | B2 | 12/2019 | Sinha et al. |
| 10,650,311 | B2 | 5/2020 | Henry |
| 10,778,412 | B2 | 9/2020 | Chen et al. |
| 11,055,604 | B2 | 7/2021 | Glesner et al. |
| 11,100,923 | B2 | 8/2021 | Fainberg et al. |
| 11,106,973 | B2 | 8/2021 | Shi et al. |
| 11,321,609 | B2 | 5/2022 | Choi et al. |
| 2006/0136570 | A1* | 6/2006 | Pandya ................. G06F 16/951 |
| | | | 709/217 |
| 2006/0245914 | A1* | 11/2006 | Adam ...................... G01K 3/06 |
| | | | 415/118 |
| 2011/0262033 | A1* | 10/2011 | Huo ....................... G06V 30/36 |
| | | | 382/187 |
| 2016/0086078 | A1 | 3/2016 | Ji et al. |
| 2018/0089301 | A1* | 3/2018 | Kafai ................... G06F 16/285 |
| 2018/0107926 | A1 | 4/2018 | Choi et al. |
| 2018/0285736 | A1 | 10/2018 | Baum et al. |
| 2018/0357530 | A1 | 12/2018 | Beery et al. |
| 2019/0042948 | A1 | 2/2019 | Lee et al. |
| 2019/0050709 | A1* | 2/2019 | Yang ...................... G06F 18/23 |
| 2019/0188554 | A1 | 6/2019 | Ma et al. |
| 2019/0205736 | A1 | 7/2019 | Bleiweiss et al. |
| 2019/0244080 | A1 | 8/2019 | Li et al. |
| 2019/0286972 | A1 | 9/2019 | El Husseini et al. |
| 2019/0294413 | A1 | 9/2019 | Vantrease et al. |
| 2019/0340492 | A1 | 11/2019 | Burger et al. |
| 2020/0285892 | A1 | 9/2020 | Baum et al. |
| 2021/0033608 | A1* | 2/2021 | Alizadeh .......... G01N 33/56977 |
| 2021/0117623 | A1 | 4/2021 | Aly et al. |
| 2022/0343146 | A1* | 10/2022 | Xue ...................... G06N 3/044 |

OTHER PUBLICATIONS

Wang et al., "Bi-GCN: Binary Graph Convolutional Network," Apr. 8, 2021.

Feng et al., "SGQuant: Squeezing the Last Bit on Graph Neural Networks with Specialized Quantization," Sep. 16, 2020.

Tailor et al., "Degree-Quant: Quantization-Aware Training for Graph Neural Networks," Mar. 15, 2021.

Jégou et al., "Product Quantization for Nearest Neighbor Search," May 22, 2013.

First Office Action and Search Report for Chinese Application No. 202210773928.8, dated Apr. 14, 2026, 26 pages.

Huang et al., "EPQuant: A Graph Neural Network compression approach based on product quantization", Neurocomputing 503 (2022): 49-61, Jun. 30, 2022.

Huang, "Research on Efficient Graph Nural Network Acceleration: Algorithm and Architechture", Zhejiang University Doctoral Dissertation, Feb. 15, 2023, 122 pages [with English Abstract].

* cited by examiner feature vector subvectors codebook

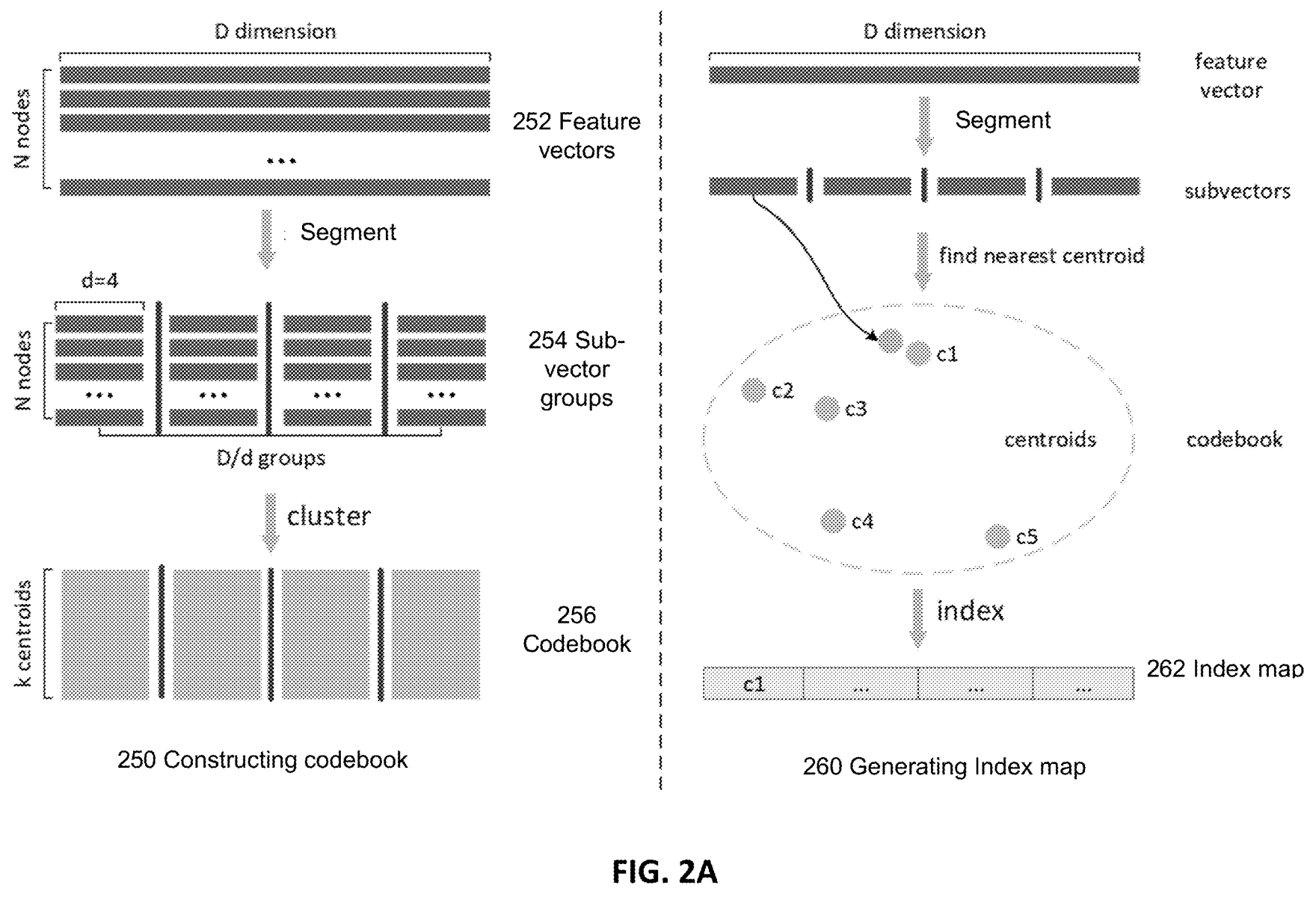

262 Index map

D dimension

Segment find nearest centroid centroids c1 c5 c3 c4 c2 index c1

260 Generating Index map

252 Feature vectors

254 Sub-vector groups

256 Codebook

D dimension

Segment

D/d groups cluster d=4

N nodes

N nodes k centroids

250 Constructing codebook

FIG. 2A

Option 1: Hash-based batching

Option 2: Locality-based batching

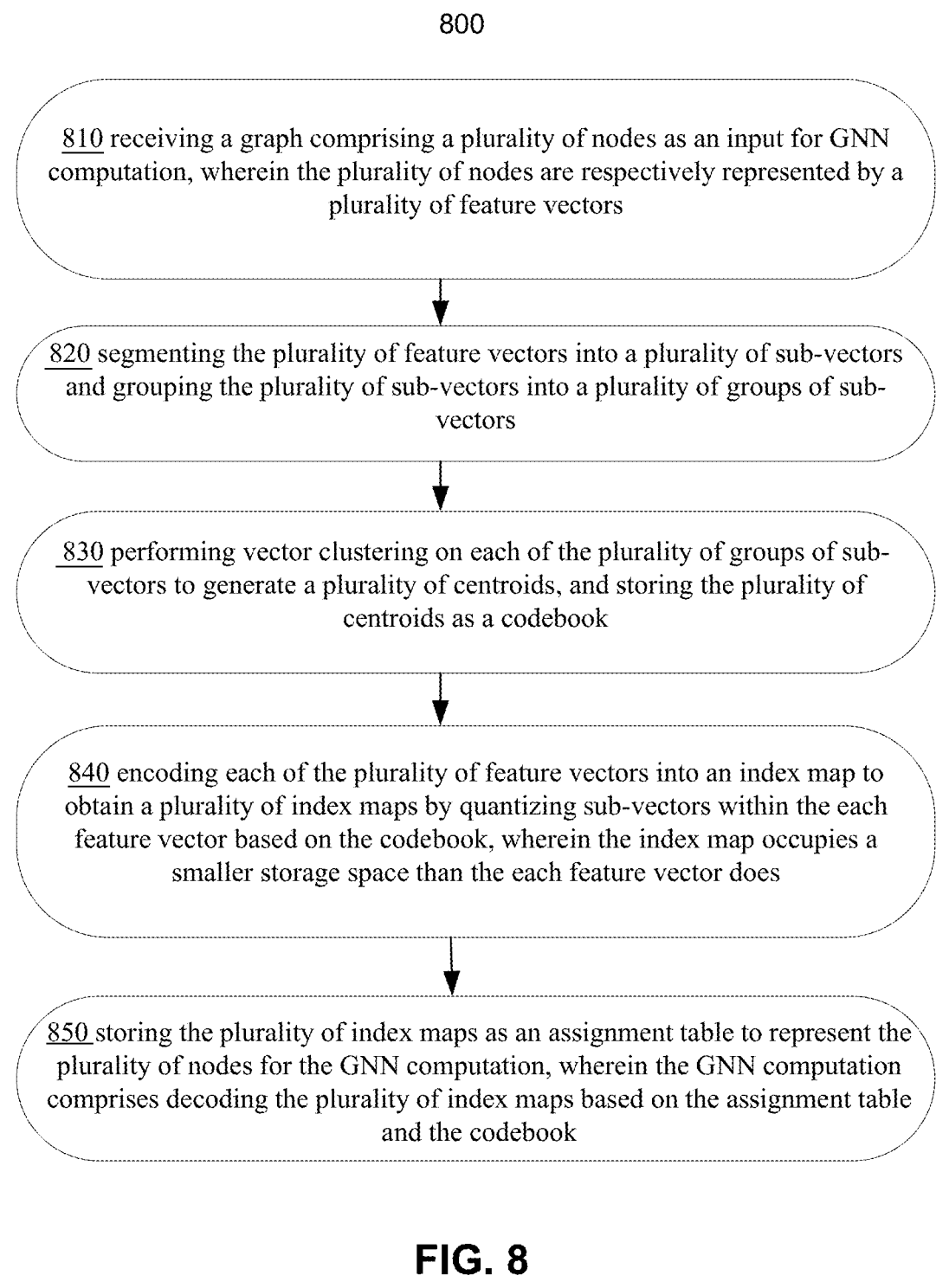

800

810 receiving a graph comprising a plurality of nodes as an input for GNN computation, wherein the plurality of nodes are respectively represented by a plurality of feature vectors 820 segmenting the plurality of feature vectors into a plurality of sub-vectors and grouping the plurality of sub-vectors into a plurality of groups of sub-vectors 830 performing vector clustering on each of the plurality of groups of sub-vectors to generate a plurality of centroids, and storing the plurality of centroids as a codebook 840 encoding each of the plurality of feature vectors into an index map to obtain a plurality of index maps by quantizing sub-vectors within the each feature vector based on the codebook, wherein the index map occupies a smaller storage space than the each feature vector does 850 storing the plurality of index maps as an assignment table to represent the plurality of nodes for the GNN computation, wherein the GNN computation comprises decoding the plurality of index maps based on the assignment table and the codebook

FIG. 8

HARDWARE ACCELERATION FRAMEWORK FOR GRAPH NEURAL NETWORK QUANTIZATION

CROSS-REFERENCE TO RELATED APPLICATION

This application claims priority to and benefits of Chinese patent Application No. 202210773928.8, filed with the China National Intellectual Property Administration (CNIPA) on Jul. 1, 2022. The entire contents of the above-identified application are incorporated herein by reference.

TECHNICAL FIELD

The disclosure relates generally to improving efficiency of graph neural networks (GNN) computation. More specifically, this disclosure relates to methods and systems for effective quantization in graph neural networks (GNN) computation.

BACKGROUND

While traditional deep learning models are good at pattern recognition and data mining by capturing hidden patterns of Euclidean data (e.g., images, text, videos), Graph neural networks (GNNs) have shown to extend the power of machine learning to non-Euclidean domains represented as graphs with complex relationships and interdependencies between objects. Research has shown that GNNs can exceed state-of-the-art performance on applications ranging from molecular inference to community detection.

One of the challenges that have so far precluded the wide adoption of GNNs in industrial applications is the difficulty to scale them to large graphs. For instance, a social media of reasonable size may have hundreds of millions of nodes and billions of edges, where each node or edge may have attribute data or feature vectors that need to be stored and accessed during the GNN computation. The amount of data to be stored, transferred, and processed during GNN computation is enormous. This disclosure describes novel hardware and software designs for effective quantization in GNNs that significantly compresses the data volume and thus improve the efficiency of GNN computation.

SUMMARY

Various embodiments of the present specification may include hardware circuits, systems, methods for quantization in GNN computation.

According to one aspect, a computer-implemented method for performing product quantization to improve GNN computation efficiency is described. The method may start with receiving a graph comprising a plurality of nodes as an input for the GNN computation, and the plurality of nodes are respectively represented by a plurality of feature vectors. Prior to the quantization step, the method may also include segmenting the plurality of feature vectors into a plurality of sub-vectors; grouping the plurality of sub-vectors into a plurality of groups of sub-vectors; performing vector clustering on each of the plurality of groups of sub-vectors to generate a plurality of centroids; and storing the plurality of centroids as a codebook. With the codebook being ready, the method may proceed with encoding each of the plurality of feature vectors into an index map to obtain a plurality of index maps by quantizing sub-vectors within the each feature vector based on the codebook. The index map occupies a smaller memory space than the each feature vector does. At last, the method may further include storing the plurality of index maps as an assignment table to represent the plurality of nodes for the GNN computation. The GNN computation comprises decoding the plurality of index maps based on the assignment table and the codebook In some embodiments, the segmenting the plurality of feature vectors into the plurality of sub-vectors and grouping the plurality of sub-vectors into a plurality of groups of sub-vectors comprises: segmenting the plurality of feature vectors into the plurality of sub-vectors of a predetermined sub-vector size; and grouping the sub-vectors into the plurality of groups of sub-vectors based on an offset of each sub-vector within a corresponding feature vector.

In some embodiments, prior to the segmenting the plurality of feature vectors into a plurality of sub-vectors, the method may further comprise: quantifying a sparsity level of the plurality of feature vectors; determining a sub-vector size based on the sparsity level, wherein the sparsity level is inversely proportional to the sub-vector size; and segmenting the plurality of feature vectors into the plurality of sub-vectors with the determined sub-vector size.

In some embodiments, each of the plurality of sub-vectors comprises one sub-vector from each of the plurality of feature vectors at a same offset.

In some embodiments, the vector clustering comprises K-means or Support Vector Clustering (SVC).

In some embodiments, the performing vector clustering on each of the plurality of groups of sub-vectors to generate the plurality of centroids comprises: within each of the plurality of groups of sub-vectors, determining multiple centroids by executing a vector clustering algorithm, wherein each of the multiple centroids comprises a vector of a same size as each of the plurality of sub-vectors.

In some embodiments, the storing the plurality of centroids in the codebook comprises: indexing the plurality of centroids with a plurality of indices; and storing mappings between the plurality of indices and the plurality of centroids.

In some embodiments, the quantizing the sub-vectors within the each feature vector based on the codebook comprises: for each of the sub-vectors that belongs to one of the plurality of groups of sub-vectors, determining one or more of the plurality of centroids that correspond to the one group of sub-vectors; determining a vector distance between the sub-vector and each of the one or more centroids; identifying one of the one or more centroids having a shortest vector distance to the sub-vector; and encoding the sub-vector using an index of the one identified centroid, wherein storing the index uses less number of bytes than storing the sub-vector.

In some embodiments, the decoding comprises: receiving a request for a feature vector representing a graph node; obtaining the index map corresponding to the requested feature vector, wherein the index map comprises one or more indices corresponding to one or more of the plurality of centroids; obtaining the one or more centroids based on the one or more indices and the codebook; and aggregating the one or more centroids as the requested feature vector of the graph node.

In some embodiments, the performing vector clustering on each of the plurality of groups of sub-vectors comprises: filtering out sub-vectors comprising all zeros from the plurality of sub-vectors; excluding the sub-vectors comprising all zeros from the vector clustering; assigning a special centroid to represent all of the sub-vectors comprising all zeros; and performing the vector clustering on the sub-vectors comprising non-zero data.

In some embodiments, the storing the codebook and the assignment table comprises: in response to an on-chip memory being sufficient to store both the codebook and the assignment table, storing both codebook and the assignment table in the on-chip memory; and in response to the on-chip memory being insufficient to store both the code book and the assignment table, storing the codebook in the on-chip memory and storing the assignment table in an off-chip memory.

In some embodiments, the method may further include: batching the plurality of nodes into a plurality of batches and assigning the plurality of batches into a plurality of processing units for parallel encoding, wherein the parallel encoding comprises: generating a codebook and an assignment table for each of the plurality of batches.

In some embodiments, the batching comprises: batching the plurality of nodes into the plurality of batches by applying a hash function to node indices of the plurality of nodes.

In some embodiments, the batching comprises: batching the plurality of nodes into the plurality of batches based on the locality of each node within the graph.

According to another aspect, a hardware accelerator for accelerating graph neural network (GNN) computation is introduced. The hardware accelerator may include one or more processors and one or more non-transitory computer-readable memories coupled to the one or more processors and configured with instructions executable by the one or more processors to cause the hardware accelerator to perform operations including: receiving a graph comprising a plurality of nodes as an input for the GNN computation, wherein the plurality of nodes are respectively represented by a plurality of feature vectors; segmenting the plurality of feature vectors into a plurality of sub-vectors; grouping the plurality of sub-vectors into a plurality of groups of sub-vectors; performing vector clustering on each of the plurality of groups of sub-vectors to generate a plurality of centroids; storing the plurality of centroids as a codebook; encoding each of the plurality of feature vectors into an index map to obtain a plurality of index maps by quantizing sub-vectors within the each feature vector based on the codebook, wherein the index map occupies a smaller memory space than the each feature vector does; and storing the plurality of index maps as an assignment table to represent the plurality of nodes for the GNN computation, wherein the GNN computation comprises decoding the plurality of index maps based on the assignment table and the codebook.

According to yet another aspect, a non-transitory computer-readable storage medium for accelerating graph neural network (GNN) computation is described. The storage medium stores instructions that, when executed by one or more processors, cause the one or more processors to perform operations including: receiving a graph comprising a plurality of nodes as an input for the GNN computation, wherein the plurality of nodes are respectively represented by a plurality of feature vectors; segmenting the plurality of feature vectors into a plurality of sub-vectors; grouping the plurality of sub-vectors into a plurality of groups of sub-vectors; performing vector clustering on each of the plurality of groups of sub-vectors to generate a plurality of centroids; storing the plurality of centroids as a codebook; encoding each of the plurality of feature vectors into an index map to obtain a plurality of index maps by quantizing sub-vectors within the each feature vector based on the codebook, wherein the index map occupies a smaller memory space than the each feature vector does; and storing the plurality of index maps as an assignment table to represent the plurality of nodes for the GNN computation, wherein the GNN computation comprises decoding the plurality of index maps based on the assignment table and the codebook.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 2A illustrates an exemplary product quantization in GNN computation in accordance with some embodiments.

FIG. 8 illustrates an exemplary method for product quantization in GNN computation in accordance with some embodiments.

DETAILED DESCRIPTION

Figure 1A:
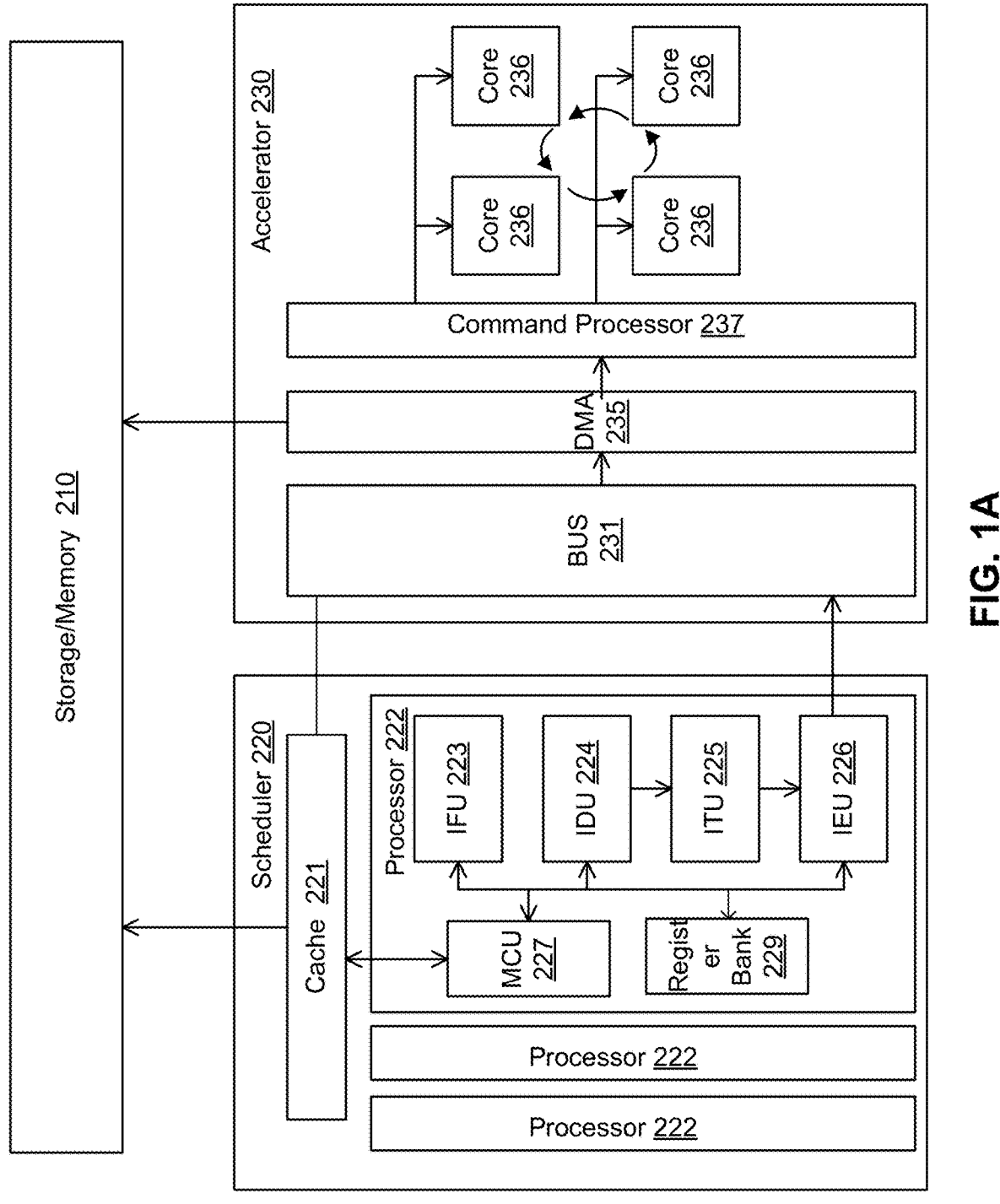
FIG. 1A illustrates a schematic diagram of a hardware device for implementing hardware accelerators in accordance with some embodiments.

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Data can be structured or unstructured. For structured data, information may be arranged according to a pre-set data model or schema. For unstructured data, information may not be arranged using a preset-data model or a pre-defined manner. For example, a text file (e.g., emails, reports, etc.) can include information (e.g., individual letters or words) that does not have a pre-defined structure. As a result, the unstructured data can include irregularities and ambiguities that make it difficult to understand using traditional programs or data structures.

One way to represent unstructured data is by using graphs. A graph is a data structure including two components— nodes (or vertices) and edges. For example, a graph G can be defined as a collection of a set of nodes V and a set of edges E between the set of nodes. A node in a graph can have a set of features or attributes (e.g., a user profile). For example, a node can have up to f number of features. As a result, for a graph with n number of nodes, a node feature matrix can have a dimension of n by f. A node can be defined as an adjacent/neighboring node of another node, if the node shares an edge with the other node. The graph can be a highly flexible data structure, as the graph may not require pre-defined rules to determine how many nodes or edges there have to be in the graphs. Because the graph can provide great flexibility, it is one of the data structures that are widely used to store or represent unstructured data (e.g., text files).

Graph Neural Network (GNN) is a type of neural network that can directly operate on graphs that have gained increasing popularity in various domains, including social networks, knowledge graphs, recommender systems, and even life science applications. The graph may have different practical meanings depending on the use cases. For example, a GNN may mine the features of users on a social media network and thereby learn the relationships among the users. As another example, nano-scale molecules have an inherent graph-like structure with the ions or the atoms being the nodes and the bonds between them, edges. GNNs can be applied to learn about existing molecular structures and discover new chemical structures. At a high level, GNN involves computation on a graph structure G=(V,E) representing a graph (undirected or directed), where V denotes vertices, E denotes edges, and (V,E) may be denoted as the data set in the graph. Each of the nodes and edges in the graph may be associated with attribute data. Therefore, efficiently storing and accessing attribute data of the graph nodes or edges is critical for improving the overall GNN computation performance.

In the existing hardware architectures (e.g., using Deep Graph Infomax (DGI) or Deep Graph Library (DGL) in PyTorch) for GNN training, the utilization rate of the GPUs of these architectures is around 20%. 80% of the GPU time is spent on waiting for the attribute data of graph nodes to be loaded from external storage. It means that the precious computing resources are idle for 80% of the time during not only the training phase but also the inference phase. This is because, in many cases, the volume of graph data to be processed by GNN networks could be enormous and is too large to fit in any of the host's on-chip memory (e.g., DDRs). Therefore, these graph data may be distributed among the hosts, and the hosts may request data from other hosts for executing the GNN computation. The data requests may be implemented through data exchange protocols, such as cross-node communication through Ethernet. The large volume of graph data to be loaded and exchanged for GNN computation imposes various challenges in addition to the waste of computing resources. For instance, cross-node communication via Ethernet has high latency and thus frequent data exchange among hosts may negatively impact GNN performance, the on-chip storage resources (e.g., FPGA DRAM) are expensive and thus too small to fit the attribute data of requested graph nodes, etc. In summary, the root cause behind these technical challenges is the large volume of graph data to be stored, loaded, exchanged, and processed by the GNNs.

FIG. 1A illustrates a schematic diagram of a hardware device for implementing hardware accelerators in accordance with some embodiments. The hardware device in FIG. 1A illustrates internal structures of a scheduler 220 and a GNN accelerator 230 for GNN computation, as well as data and instruction flows among the scheduler 220, the accelerator 230, and an external storage/memory 210.

As shown in FIG. 1A, the scheduler 220 may include multiple processors 222 and a cache 221 shared by the multiple processors 222. Each processor 222 may include an instruction fetching unit (IFU) 203, an instruction decoding unit (IDU) 224, an instruction transmitting unit (ITU) 225, and an instruction execution unit (IEU) 226.

In some embodiments, the IFU 223 may fetch to-be-executed instructions or data from the storage/memory 210 to a register bank 229. After obtaining the instructions or data, the scheduler 220 enters an instruction decoding stage. The IDU 224 decodes the obtained instruction according to a predetermined instruction format to determine operand(s) acquisition information, where the operands are required to execute the obtained instruction. In some embodiments, the operand(s) acquisition information may include pointers or addresses of immediate data, registers, or other software/hardware that provide the operand(s).

In some embodiments, the ITU 225 may be configured between the IDU 224 and the IEU 226 for instruction scheduling and management. It may efficiently allocate instructions to different IEUs 226 for parallel processing.

In some embodiments, after the ITU 225 allocates an instruction to one IEU 226, the IEU 226 may execute the instruction. However, if the IEU 226 determines that the instruction should be executed by the accelerator 230, it may forward the instruction to the corresponding accelerator 230 for execution. For example, if the instruction is directed to GNN computation based on an input graph, the IEU 226 may send the instruction to the accelerator 230 via a bus 231 for the accelerator 230 to execute the instruction.

In some embodiments, the accelerator 230 may include multiple cores 236 (4 cores 236 are shown in FIG. 1A, but those skilled in the art may appreciate that the accelerator 230 may also include other numbers of cores 236), a command processor 237, and a direct storage access (DMA) interface 235, and the bus channel 231.

The bus channel 231 may include a channel through which instructions/data enter and exit the accelerator 230. The DMA interface 235 may refer to a function provided by some computer bus architectures, which enables devices to directly read data from and/or write data to the memory 210. Compared with the method in which all data transmission between devices passes through the scheduler 220, the architecture illustrated in FIG. 1A greatly improves the efficiency of data access. For instance, the core of the accelerator 230 may directly access the memory 210 and read the parameters of a neural network model (for example, the weight of each node in a graph) and/or input data.

The command processor 237 may be configured to allocate the instructions sent by the scheduler 220 via the IEU 226 to the accelerator 230 to the cores 236 for execution. After the to-be-executed instructions enter the accelerator 230 from the bus channel 231, they may be cached in the command processor 237, and the command processor 237 may select the cores 236 and allocate the instructions to the cores 236 for execution. In addition, the command processor 237 may be also responsible for the synchronization operation among the cores 236.

GNN computation is heavily dependent on the graph structure and the attribute data of the nodes/edges within the graph structure. For example, the attribute data of each node, commonly represented as a feature vector, is embedded via aggregate-combine functions iteratively in the GNN computation phase to incorporate the interdependence or relationship between the node and its neighboring nodes. During this process, the GNN accelerator 230 needs to retrieve the attribute data of graph nodes/edges of interest and feed the retrieved data to attribute processing units (e.g., processors like central processing units (CPU), graphic processing units (GPU), tensor processing units (TPU), neural processing units (NPU), etc.) for computation. This step of attribute data retrieval in the GNN accelerator is often deemed as the performance bottleneck due to the large volume of data to be retrieved and the slow access speed of the external memory 210. To address this issue, the GNN accelerator 230 may provide an attribute cache to hold the attribute data that are retrieved from the external memory 210 and for the consumption of the attribute processing units.

Figure 1B:
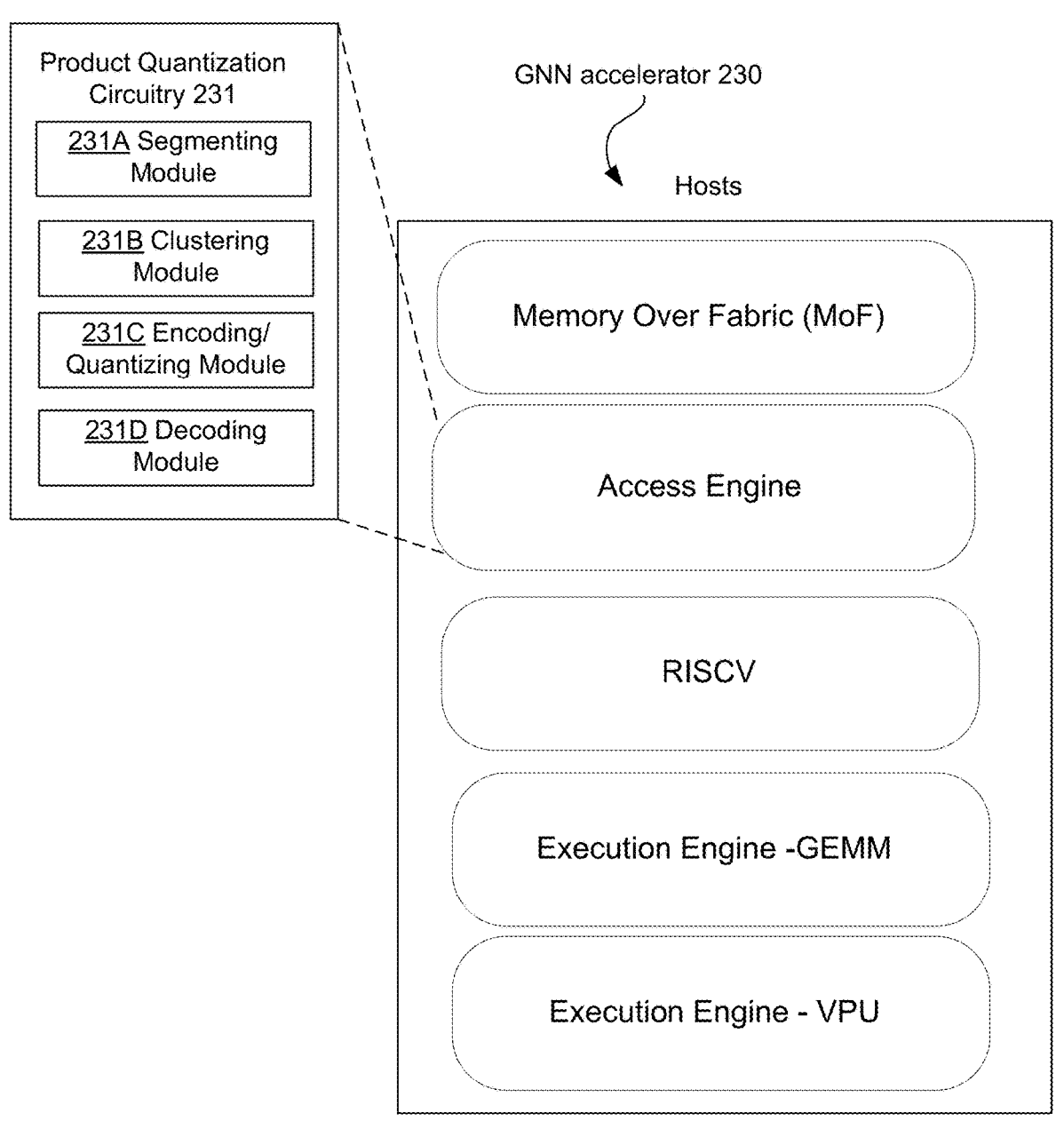
FIG. 1B illustrates a system diagram of a hardware GNN accelerator for implementing product quantization in GNN computation in accordance with some embodiments.

FIG. 1B illustrates a system diagram of a GNN accelerator 230 for implementing product quantization in GNN computation in accordance with some embodiments. The system diagram in FIG. 1B merely illustrates the hardware components in the GNN accelerator 230, and depending on the implementation, the GNN accelerator 230 may include more, fewer, or alternative components for implementing other proper functionalities. In some embodiments, the GNN accelerator 230 may be an integrated circuitry associated with a processor.

In some embodiments, the GNN accelerator 230 comprises one or more hosts (e.g., implemented with FPGA or ASIC) for collectively accelerating GNN data accessing and computing. As shown in FIG. 1B, each host may include a memory over fabric (MoF, e.g., a persistent memory over fabric) or Ethernet, an access engine, a processing unit with RISC-V (i.e., an instruction set architecture based on reduced instruction set computer (RISC) principles), an execution engine for performing general matrix multiplication (GEMM), an execution engine with vision processing units (VPU), a shared memory, or any combination thereof.

In some embodiments, the GNN accelerator 230 may implement a product quantization to obtain significant memory saving and achieve computation acceleration with negligible accuracy loss. The product quantization design may be implemented as a set of instructions (software) or a hardware circuitry. Taking the host of the GNN accelerator 230 in FIG. 1B as an example, a product quantization circuitry 231 may be implemented in one of the components in the host, such as the access engine. The access engine may act as a graph data access hub configured to store the received graph data (e.g., node attribute data) and respond to requests for the graph data. The product quantization circuitry 231 may be designed to help the access engine to compress the graph data using product quantization. In some embodiments, the product quantization circuitry 231 may include a segmenting module 231A, a clustering module 231B, an encoding/quantizing module 231C, and a decoding module 231D.

In some embodiments, the segmenting module 231A may be configured to segment the received graph data into groups. For simplicity, the graph data is referred to as feature vectors of the graph nodes (the feature vectors are vectorized presentations of the attributes of the graph nodes). The segmentation may include segmenting a plurality of feature vectors into a plurality of sub-vectors and grouping the plurality of sub-vectors into a plurality of groups of sub-vectors. For example, the plurality of feature vectors may first be segmented into the plurality of sub-vectors of a predetermined sub-vector size. The sub vectors may then be grouped into a plurality of groups of sub-vectors based on an offset of each sub-vector within a corresponding feature vector. Each of the plurality of sub-vectors comprises one sub-vector from each of the plurality of feature vectors at the same offset. In some embodiments, the size of the sub-vectors may be pre-determined based on the sparsity level of the plurality of feature vectors. For example, the sub-vector size may be determined by: quantifying a sparsity level of the plurality of feature vectors; determining a sub-vector size based on the sparsity level, wherein the sparsity level is inversely proportional to the sub-vector size; and segmenting the plurality of feature vectors into the plurality of sub-vectors using the determined sub-vector size. An example of segmentation is further illustrated in FIG. 2A.

In some embodiments, the clustering module 231B may be configured to perform vector clustering on each of the plurality of groups of sub-vectors to generate a plurality of centroids, and store the plurality of centroids as a codebook. The vector clustering may adopt various algorithms such as K-means or Support Vector Clustering (SVC). For example, within each of the plurality of groups of sub-vectors, one or more centroids may be determined by executing the vector clustering algorithm. Each centroid is a vector that has the same size as each of the plurality of sub-vectors. In some embodiments, the vector clustering may be adjusted when the plurality of feature vectors has a sparsity level greater than a threshold. For example, all-zero sub-vectors may be filtered out from the clustering process, and directly assigned a special centroid. In some embodiments, these centroids are collectively stored in a codebook for quantizing the feature vectors of the graph nodes. In some embodiments, each group of sub-vectors may go through the clustering process and generate a corresponding group-codebook including one or more centroids for the specific group. In some embodiments, the final codebook may be generated as a Cartesian product of the plurality of group-codebooks. This way, the final codebook may include all combinations of the centroids from different group-codebooks.

In some embodiments, the encoding/quantizing module 231C may be configured to encode each of the plurality of feature vectors into an index map to obtain a plurality of index maps by quantizing sub-vectors within the each feature vector based on the codebook. The index map occupies a smaller storage space than the each feature vector does. For example, the feature vectors of graph nodes may include floating numbers that each takes up 4 bytes, and each sub-vector may include multiple floating numbers (e.g., 25 floating numbers occupy 100 bytes). With the quantization, each sub-vector may be represented with a centroid index that may only take a few bits. This way, the feature vectors can be significantly compressed.

In some embodiments, the quantizing process may include: for each of the sub-vectors that belongs to one of the plurality of groups of sub-vectors, determining one or more of the plurality of centroids that correspond to the one group of sub-vectors; determining a vector distance between the sub-vector and each of the one or more centroids; identifying one of the one or more centroids having a shortest vector distance to the sub-vector; and encoding the sub-vector using an index of the one identified centroid, where storing the index uses less number of bytes than storing the sub-vector. That is, the quantization of a given sub-vector from a graph node's feature vector is based on the centroids in the corresponding group-codebook (generated based on clustering the group of sub-vectors to which the given sub-vector belongs). Each group-codebook may have a corresponding quantizer for quantizing sub-vectors in its corresponding group. Different group-codebooks may have different quantizers. A typical quantizer may be a function computing Euclidean distances between an input sub-vector and the centroids in the corresponding group-codebook.

In some embodiments, the decoding module 231D may be triggered when the stored graph data are requested (e.g., for GNN computation). Since the feature vectors of the graph nodes are already encoded and stored as the index maps, the decoding module 231D may be configured to decode the index maps of the requested graph nodes back to the form of feature vectors based on the indices in the index maps and the codebook. For example, the decoding may include: receiving a request for a feature vector representing a graph node; obtaining the index map corresponding to the requested feature vector, where the index map includes one or more indices corresponding to one or more of the plurality of centroids; obtaining the one or more centroids by looking up the one or more indices in the codebook; and aggregating the one or more centroids as the requested feature vector of the graph node and return it.

Experimental results show the above-described product quantization circuitry could achieve memory saving of 227×, 317×, 47×, and 35× for processing graph data obtained from Cora, Citeseer, PubMed, and Reddit, respectively. This design is architecture-agnostic and is able to expand to almost all existing GNN models. Because of the reduced memory footprints and bandwidth reduction, GNN training and inference may be accelerated. Furthermore, it also facilitates the deployment of GNN applications on source limited devices.

FIG. 2A illustrates an exemplary product quantization in GNN computation in accordance with some embodiments. The product quantization process illustrated in FIG. 2A includes two phases: a first phase 250 for constructing a codebook, and a second phase 260 for generating index maps for the graph nodes.

The first phase 250 may start with receiving N graph nodes, each graph node being represented as a feature vector 252 of D-dimension. The plurality of feature vectors 252 may then be segmented into sub-vectors 254. For instance, each of the D-dimension feature vectors 252 may be segmented into a plurality of d-dimension sub-vectors (d<D) 254. The sub-vectors 254 from the same offset in the plurality of feature vectors 252 may be grouped together. For instance, the first sub-vectors (offset=0) within the plurality of D-dimension feature vectors 252 may form the first group, and the sub-vectors (offset=d) with the plurality of D-dimension feature vectors 252 may form the second group. That is, the segmentation is performed within each of the feature vectors 252, and the grouping is performed across different feature vectors 252.

In some embodiments, the size of the sub-vectors may be determined based on the sparsity level of the feature vectors 252. Here, the "sparsity level" refers to a percentage of zero-values in the feature vectors 252. A higher sparsity level of the feature vectors may be segmented into smaller sub-vectors. That is, the sparsity level is inversely proportional to the sub-vector size. The reason is that it is more desirable to focus the non-zero portions of the feature vectors for clustering and quantization and excludes the zero portions.

After determining the groups of sub-vectors, a clustering algorithm such as K-means or SVC may be performed to each of the group of sub-vectors to determine one or more representative sub-vectors, which are referred to as centroids. For example, if the K-means algorithm is applied, each group of sub-vectors may generate K centroids. Each centroid is a vector of the same size as the sub-vectors. These centroids are stored in a codebook 256 for quantizing the feature vectors 252.

The second phase 260 for generating index maps may be illustrated using one D-dimension feature vector as an example. The D-dimension feature vector is segmented into the sub-vectors of the predetermined sub-vector size. For each of the sub-vectors, a centroid from the codebook having the shortest vectorized distance (e.g., Euclidean distance) from the sub-vector may be identified. As shown in FIG. 2A, the first sub-vector may be close to the centroid "c1." In this case, the first sub-vector may be quantized into an index referring to the centroid "c1." Since the sub-vector may include multiple floating numbers whereas the centroid index may include one pointer (e.g., an integer index, a few bits if a bit map is used), quantizing the sub-vectors in the D-dimension feature vector into an index map 262 (a list of centroid indices) may significantly reduce the memory footprint of the D-dimension feature vector.

Figure 2B:
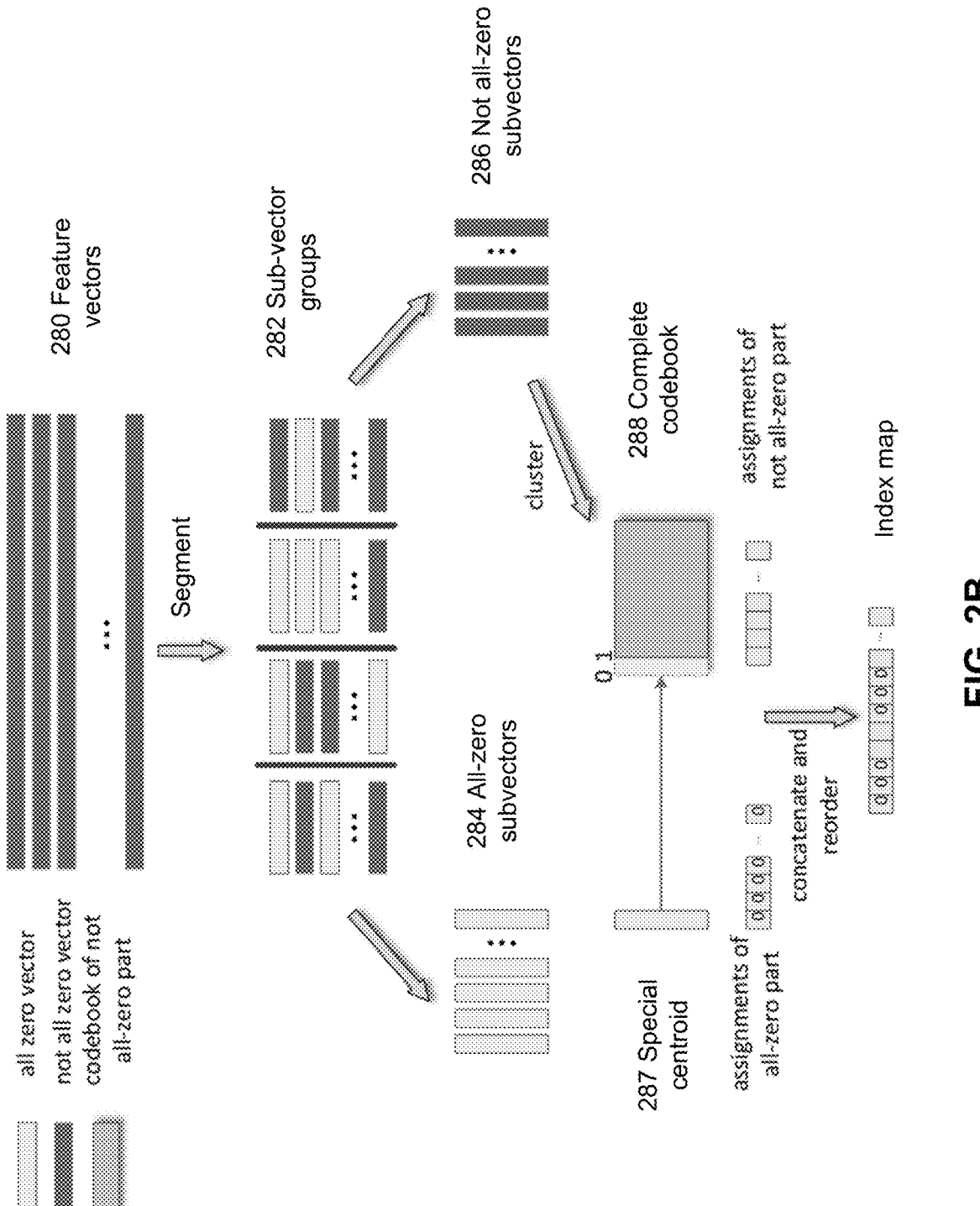
FIG. 2B illustrates an exemplary product quantization in GNN computation involving sparse feature vectors in accordance with some embodiments.

FIG. 2B illustrates an exemplary product quantization in GNN computation involving sparse feature vectors in accordance with some embodiments. In practical applications, the input graph for a GNN may be sparse, in which the feature vectors 280 of the graph nodes may include a large number of zeros. During the above-described segmenting-grouping-clustering process for generating the codebook, these sparse feature vectors 280 may be segmented and generate all-zero sub-vectors 284. In certain cases, these all-zero sub-vectors 284 may negatively impact the accuracy of the clustering step.

In some embodiments, after segmenting and grouping the sparse feature vectors 280 into sub-vector groups 282, the all-zero sub-vectors 284 are filtered out and excluded from the clustering algorithm. It means only the not-all-zero sub-vectors 286 will go through the clustering process to generate the centroids. The all-zero sub-vectors 284 may be directly assigned a special centroid 287 (e.g., a centroid with index 0). The generated centroids from clustering and the special centroid 287 may be aggregated and stored as a complete codebook 288. This way, these all-zero sub-vectors 284 may be quantized into the same index corresponding to the special centroid 287, and other not-all-zero sub-vectors 282 may be mapped to the regular centroid indices.

For example, if the special centroid has an index 0, the index map for a given feature vector may include a plurality of zeros. To further compress the representation of the feature vector, the index map may be compressed using a compact format such as CSR (compressed sparse row).

Figure 3:
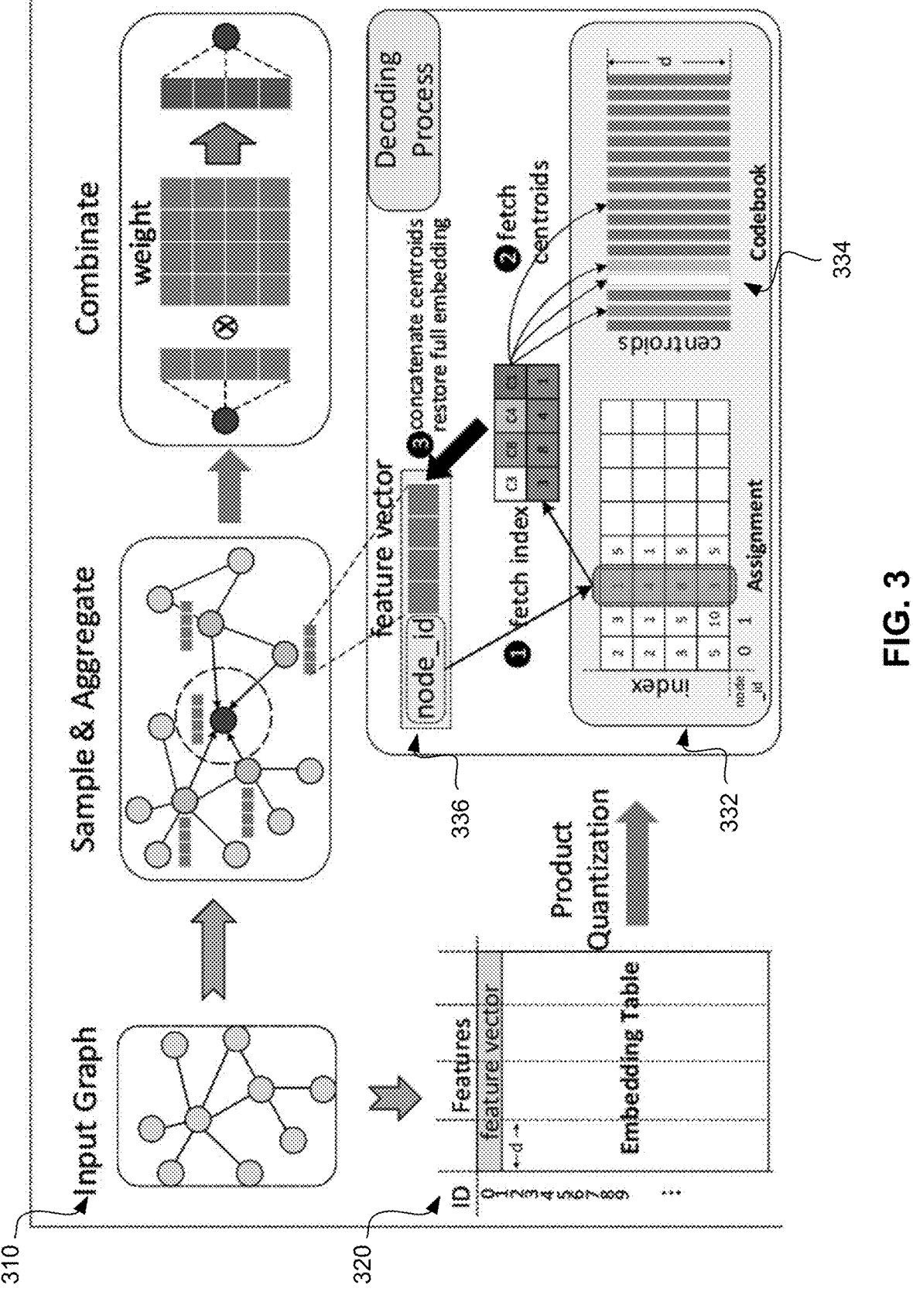
FIG. 3 illustrates an exemplary block diagram of GNN computation with product quantization in accordance with some embodiments.

FIG. 3 illustrates an exemplary block diagram of GNN computation with product quantization in accordance with some embodiments. GNN computation combines graph node feature information with an input graph by recursively passing neural messages along edges of the input graph. This process may include three phases: (1) quantizing the graph node feature vectors, (2) sampling graph nodes to determine which feature vectors need to be read and computed, and (3) decoding the feature vectors of the sampled nodes for GNN computation. Various applications may be performed based on the learned relationships, such as node classification, graph classification, link/edge prediction, etc. The GNN learns the underlying relationships among the nodes/edges. FIG. 3 illustrates the phases (1) and (3) of the above-described GNN computation.

As shown in FIG. 3, an input graph 310 may include a plurality of nodes and edges. The feature vectors of the graph nodes and/or edges may be organized as an embedding table 320 in preparation for product quantization. The embedding table 320 may include a plurality of rows respectively storing the plurality of feature vectors. In some embodiments, the embedding table 320 may be segmented along its column dimension into a plurality of groups of sub-vectors. The size of each sub-vector may be denoted as d, which may be determined based on the sparsity level of the feature vectors. Each group of sub-vectors may then go through a clustering algorithm to generate one or more centroids. Each centroid is a representative sub-vector within the group. The centroids generated for a group of sub-vectors may be denoted as a group-codebook. After the plurality of groups are processed in parallel (e.g., by executing the clustering algorithm in parallel) to generate a plurality of group-codebooks, a final codebook 334 may be generated based on the plurality of group-codebooks. For example, the final codebook 334 may be an aggregation of the plurality of group-codebooks, or a Cartesian product of the plurality of group-codebooks, etc. The centroids in the final codebook 334 are indexed with corresponding indices. Each index may be represented as a number of bits, which may be determined based on the quantity of centroids in the final codebook 334.

Using the indexed centroids in the codebook, the feature vectors of the input graph 310 may be quantized into index maps, which are collectively called assignment 332. Each index map corresponding to one feature vector, and may include a plurality of indices corresponding to the sub-vectors of the feature vector. As shown in FIG. 3, the feature vector for node_id=0 is represented by four indices [2, 2, 3, 5] of corresponding centroids.

The above-described product quantization is based on the grouping of sub-vectors within feature vectors in a graph. This approach may break through the bottleneck of traditional Scalar Quantization (SQ) approaches with regarding compression ratio. SQ quantizes each scalar values, thus the compression ratio is really limited by the size difference between the original scalar value and the quantized scalar value. In contrast, the compression ratio of the product quantization may be determined by the size of the sub-vectors and the size of centroid indices. Each sub-vector may include a number of large size scalar values, whereas each centroid index may be as small as a number of binary digits or bits (e.g., a binary logarithm of the number of centroids). Therefore the product quantization may reach a much greater compression ratio in comparison to SQ.

After the quantization process, GNN computation may request sampled nodes' feature vectors for training and inferencing. For example, a request for the feature vector of node with node_id may be received. Based on the node_id, a corresponding index map may be identified from the assignment 332. FIG. 3 shows an example index map of [1, 4, 8, 3], which respectively correspond to centroids "C1, C4, C8, C3." Based on the indices in the index map, the corresponding centroids may be fetched from the codebook to reconstruct a feature vector for the requested node. The reconstructed feature vector may then be used for the GNN computation. This process may also be referred to as a decoding process that decodes the index map back into a feature vector using the codebook. In some embodiments, the GNN computation may include passing the feature information of neighboring nodes through the graph structure and training weights for these feature information.

Figure 4:
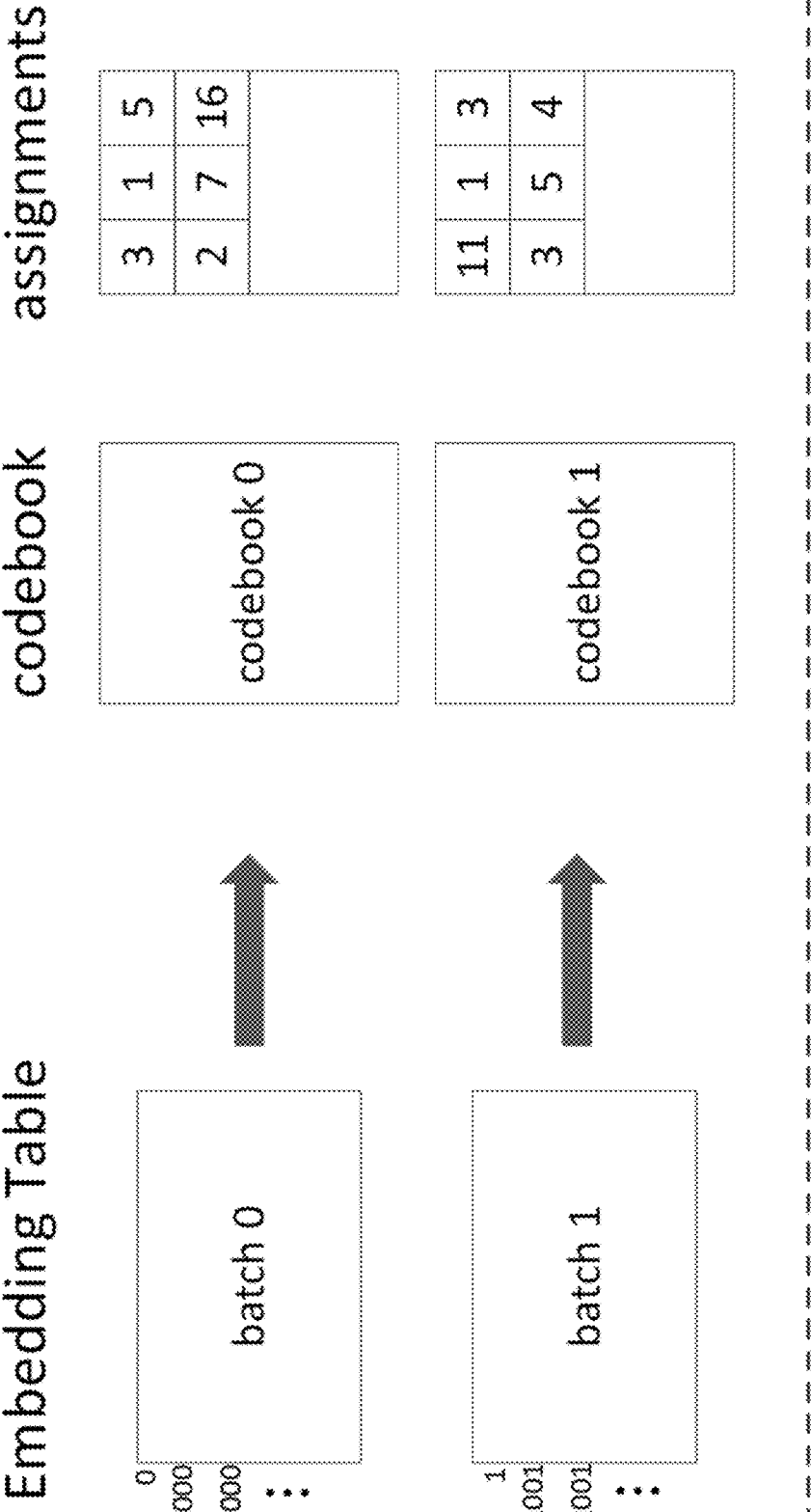
FIG. 4 illustrates exemplary batch processing in a product quantization in GNN computation in accordance with some embodiments.

FIG. 4 illustrates exemplary batch processing in a product quantization in GNN computation in accordance with some embodiments. This product quantization described in FIGS. 1A-3 may be further improved by parallel processing. During the product quantization process, the graph nodes may be divided into batches and distributed to different processing units for clustering and generating centroids. the batching process of the graph nodes may be implemented in various ways.

In some embodiments, a hash-based batching may be used to divide the graph nodes into batches. For instance, a hash function may take a graph node index as input, and generate a batch index referring to a batch to which the graph node should belong. In some embodiments, a locality-based batching may be adopted to batch the neighboring graph nodes. The locality refers to the relative distance between nodes within the graph. In some cases, the locality-based batching approach may yield better performance in cases where the GNNs tend to sample co-located graph nodes for computation. With locality-based batching, the centroids representing neighboring graph nodes are co-located in the same codebook. Thus reading the attribute data of the sampled graph nodes may only need to access the centroids within one codebook.

After batching, the generated batches of graph nodes may be distributed and processed in parallel using multiple processing units. For instance, each batch of graph nodes may be assigned to one accelerator host shown in FIG. 1B and go through segmentation (segmenting the feature vectors into groups of sub-vectors), clustering (performing clustering algorithms on the groups of sub-vectors), and codebook generating steps to generate a codebook for the batch of graph nodes.

Figure 5:
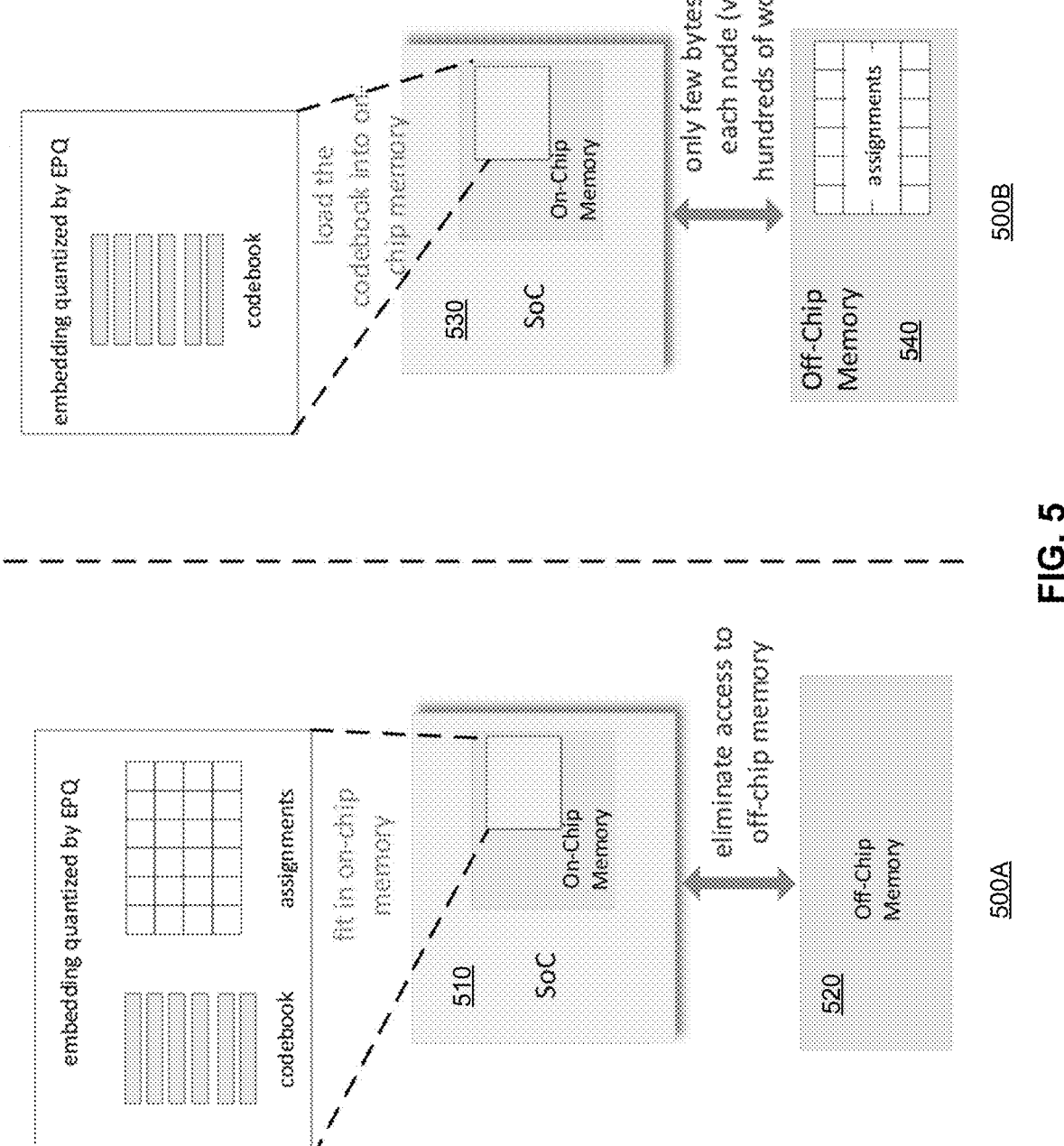
FIG. 5 illustrates exemplary data storage schemes for storing codebooks and assignments of product quantization in GNN computation with some embodiments.

FIG. 5 illustrates exemplary data storage schemes for storing codebooks and assignments of product quantization in GNN computation in accordance with some embodiments. The storage locations of the codebooks and assignments (index maps) may directly affect the data accessing efficiency and thus the overall GNN performance. An optimal storage scheme may reduce or minimize the chance to retrieve data from a higher-latency storage (such as off-chip memory), and if the retrieval is unavoidable, reduce or minimize the volume of data to be retrieved from the higher-latency storage. The optimal storage scheme may be determined based on the sizes of the codebooks, the assignments, and the size of low-latency storage (e.g., such as on-chip memory).

FIG. 5 illustrates two cases. In case 500A, the GNN accelerator is implemented as a system on chip (SoC) 510, which has an on-chip memory that can be sufficient to store both the codebook and the assignments. In this case, storing both the codebook and assignments into on-chip memory may eliminate or reduce the access to the off-chip memory 520. This way, the feature vector retrieving and decoding operations may only interact with the low-latency on-chip memory.

In case 500B, the on-chip memory of the SoC 530 may only fit one of the codebook or the assignments. Since obtaining a feature vector for GNN computation involves both reading an image map from the assignments as well as the corresponding centroids based on the image map to decode the feature vector, both assignments and codebook need to be accessed. However, considering the volume of data to be read from the assignments is considerably smaller than the volume of data to be read from the codebook, it is preferred to store the codebook in the on-chip memory and leave the assignments in the off-chip memory 540. In other words, the storing of the codebook is assigned a higher priority than the storing of the assignments (e.g., the assignment table). For example, one graph node's feature vector may be represented by an index map of a few indices, which means the volume of data to be read from the off-chip memory 540 is only a few bytes for each graph node. During the decoding process, the indices in the index map may be used to identify the corresponding centroids stored in the on-chip memory. Each centroid may be a sub-vector including a plurality of floating numbers or words.

For a typical memory system with 4 MB on-chip memory and 16 GB off-chip memory, a codebook for a billion-node-level graph may be fit in a single machine (e.g., SoC), either as case 500A or 500B depending on the actual compression ratio.

Figure 6:
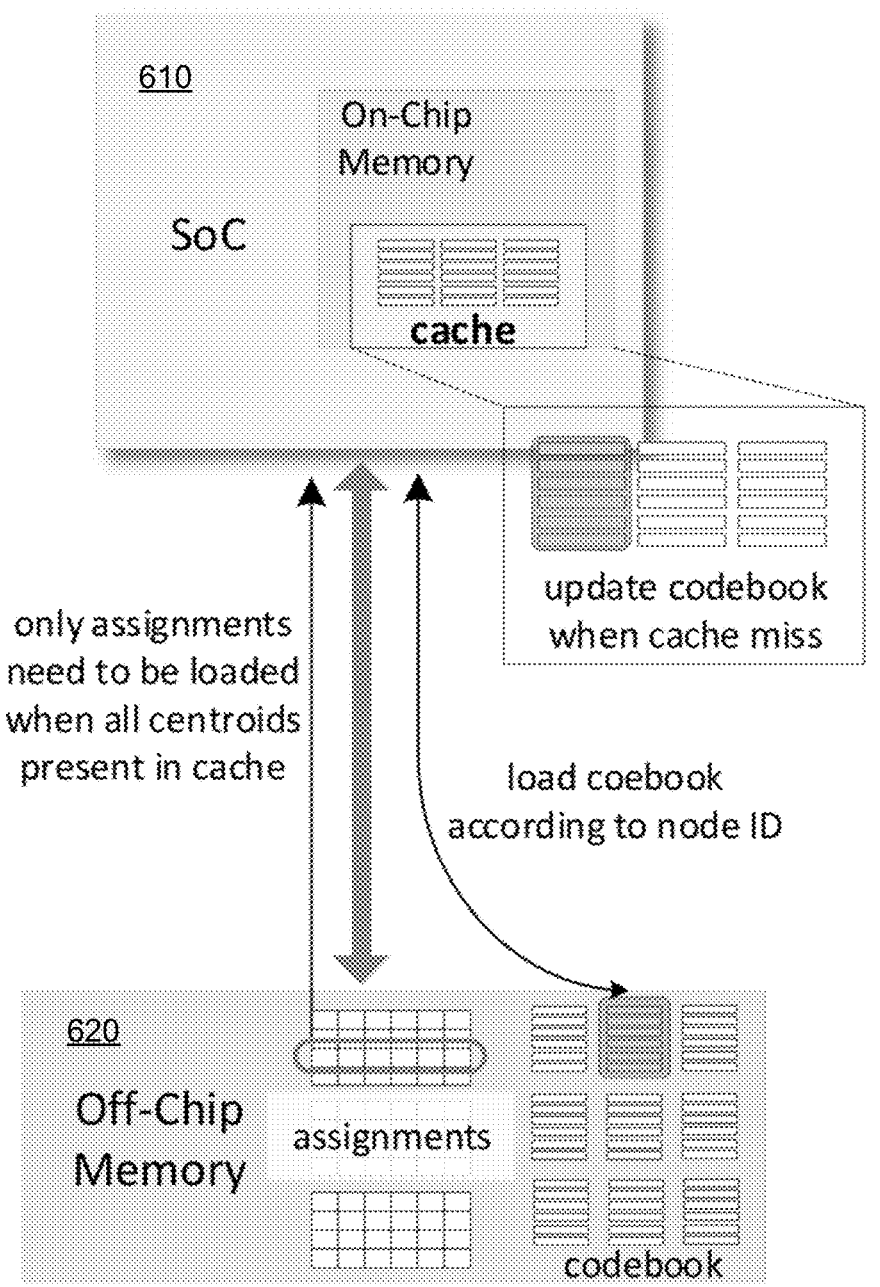
FIG. 6 illustrates another exemplary data storage scheme for storing codebooks and assignments of product quantization in GNN computation with some embodiments.

FIG. 6 illustrates another exemplary data storage scheme for storing codebooks and assignments of product quantization in GNN computation with some embodiments. In the case illustrated in FIG. 6, the on-chip memory of the SoC 610 does not have sufficient space to store the entire codebook. When the codebook is at this scale, it is likely that the input graph for GNN computation is also large and needs to be divided into batches for parallel processing. FIG. 6 shows that the codebook includes a plurality of sub-codebooks, which may refer to group-based codebooks (each codebook corresponding to a group of sub-vectors) or batch-based codebooks (each codebook corresponding to a batch of graph nodes in the input graph).

Similar to case 500B in FIG. 5, it is preferred to store some sub-codebooks into the on-chip memory of the SoC 610, and leave the other sub-codebooks and the assignments in the off-chip memory 620. When the sub-codebooks stored in the on-chip memory experiences cache misses, new sub-codebooks may be loaded from the off-chip memory 620 into the on-chip memory.

In some embodiments, the loading of the sub-codebooks may be performed simultaneously with the graph node sampling process. As described above, GNN usually samples certain nodes for computation, and the sampling process may iteratively sample multiple nodes. Based on the node_ids of the sampled nodes, the corresponding sub-codebooks may be identified and prefetched into the on-chip memory while the sampling process is going on. In some embodiments, if the locality-based batching approach illustrated in FIG. 4 is applied, the centroids of the co-located/neighboring graph nodes are likely co-located within the same sub-codebook. When the GNN samples neighboring nodes for a given graph node, the given graph node's node_id may be used to identify the corresponding sub-codebook, which may have a great chance to contain the centroids for the to-be-sampled nodes as well.

Figure 7:
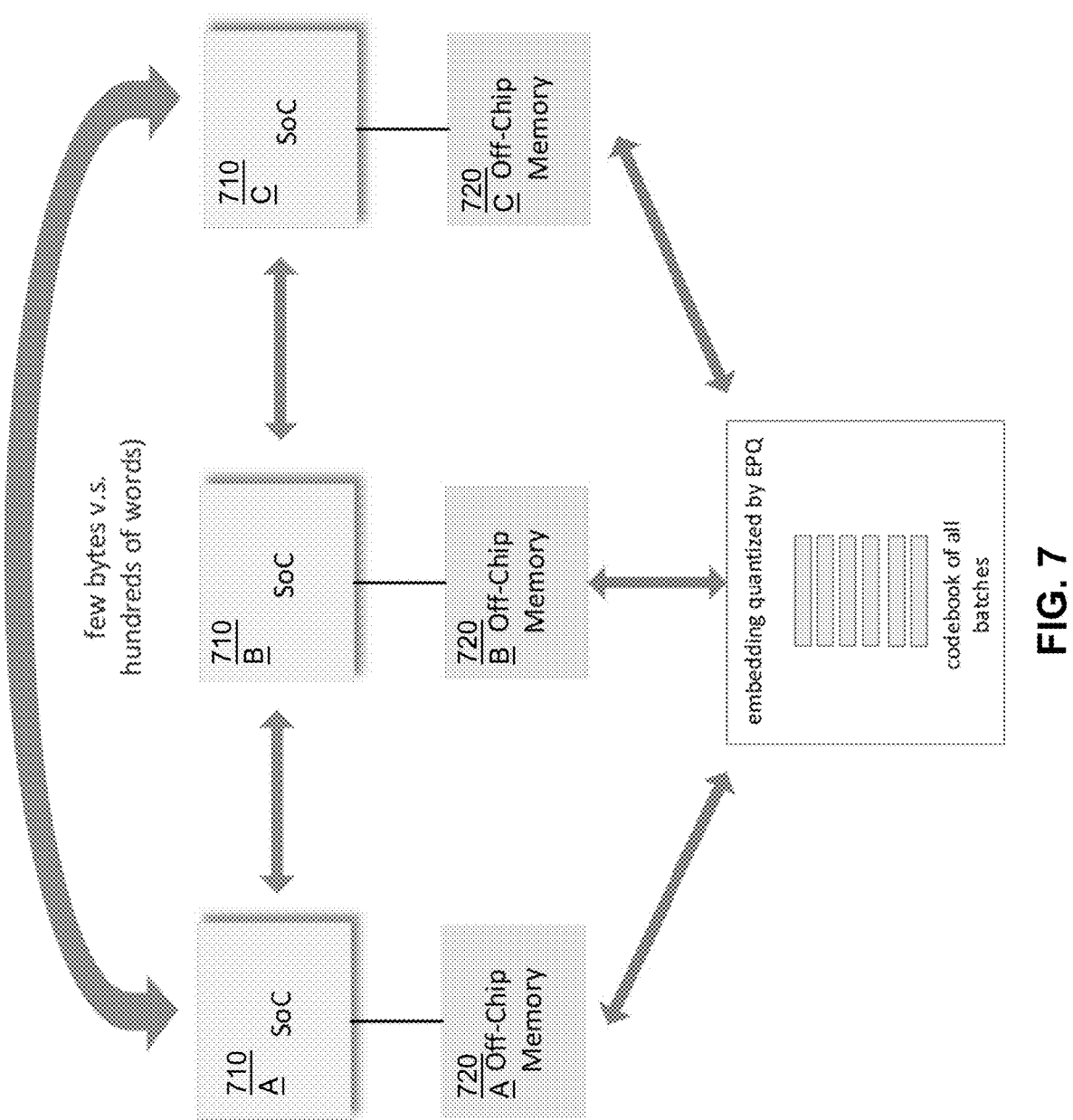
FIG. 7 illustrates yet another exemplary data storage scheme for storing codebooks and assignments of product quantization in GNN computation with some embodiments.

FIG. 7 illustrates yet another exemplary data storage scheme for storing codebooks and assignments of product quantization in GNN computation with some embodiments. The diagram illustrated in FIG. 7 includes a distributed system with multiple SoCs 710A-710C, each being associated with an off-chip memory 720A-720C.

In this case, each of the SoCs 710A-710C may store the full codebook for all graph nodes in its corresponding off-chip memory. It means the full codebook may be replicated among the off-chip memory 720A-720C. Each of the SoCs 710A-710C may store the image maps of some graph nodes that are assigned to it. This way, the cross-SoC data communication may only involve the transfer of image maps whose size is much less than the centroids.

FIG. 8 illustrates an exemplary method for product quantization in GNN computation in accordance with some embodiments. The method 800 may be implemented in an environment shown in FIGS. 1A-1B. The method 800 may be performed by a device, apparatus, or system illustrated by FIGS. 1A-7, such as the access engine in FIG. 1B. Depending on the implementation, the method 800 may include additional, fewer, or alternative steps performed in various orders or parallel.

Step 810 of method 800 includes receiving a graph comprising a plurality of nodes as an input for the GNN computation, wherein the plurality of nodes are respectively represented by a plurality of feature vectors.

Step 820 of method 800 includes segmenting the plurality of feature vectors into a plurality of sub-vectors and grouping the plurality of sub-vectors into a plurality of groups of sub-vectors. In some embodiments, the segmenting the plurality of feature vectors into the plurality of sub-vectors and grouping the plurality of sub-vectors into a plurality of groups of sub-vectors comprises: segmenting the plurality of feature vectors into the plurality of sub-vectors of a predetermined sub-vector size; and grouping the sub-vectors into the plurality of groups of sub-vectors based on an offset of each sub-vector within a corresponding feature vector. In some embodiments, before segmenting the plurality of feature vectors, the method 800 may further include: quantifying a sparsity level of the plurality of feature vectors; determining a sub-vector size based on the sparsity level, wherein the sparsity level is inversely proportional to the sub-vector size; and segmenting the plurality of feature vectors into the plurality of sub-vectors with the determined sub-vector size. In some embodiments, each of the plurality of sub-vectors comprises one sub-vector from each of the plurality of feature vectors at a same offset.

Step 830 of method 800 includes performing vector clustering on each of the plurality of groups of sub-vectors to generate a plurality of centroids, and storing the plurality of centroids as a codebook. In some embodiments, the vector clustering comprises K-means or Support Vector Clustering (SVC). In some embodiments, the performing vector clustering on each of the plurality of groups of sub-vectors to generate the plurality of centroids comprises: within each of the plurality of groups of sub-vectors, determining multiple centroids by executing a vector clustering algorithm, wherein each of the multiple centroids comprises a vector of a same size as each of the plurality of sub-vectors. In some embodiments, the storing the plurality of centroids in the codebook comprises: indexing the plurality of centroids with a plurality of indices; and storing mappings between the plurality of indices and the plurality of centroids. In some embodiments, the performing vector clustering on each of the plurality of groups of sub-vectors comprises: filtering out sub-vectors comprising all zeros from the plurality of sub-vectors; excluding the sub-vectors comprising all zeros from the vector clustering; assigning a special centroid to represent all of the sub-vectors comprising all zeros; and performing the vector clustering on the sub-vectors comprising non-zero data. In some embodiments, the storing the codebook and the assignment table comprises: in response to an on-chip memory being sufficient to store both the codebook and the assignment table, storing both codebook and the assignment table in the on-chip memory; and in response to the on-chip memory being insufficient to store both the code book and the assignment table, storing the codebook in the on-chip memory and storing the assignment table in an off-chip memory.

Step 840 of method 800 includes encoding each of the plurality of feature vectors into an index map to obtain a plurality of index maps by quantizing sub-vectors within the each feature vector based on the codebook, wherein the index map occupies a smaller memory space than the each feature vector does. In some embodiments, the quantizing the sub-vectors within the each feature vector based on the codebook comprises: for each of the sub-vectors that belongs to one of the plurality of groups of sub-vectors, determining one or more of the plurality of centroids that correspond to the one group of sub-vectors; determining a vector distance between the sub-vector and each of the one or more centroids; identifying one of the one or more centroids having a shortest vector distance to the sub-vector; and encoding the sub-vector using an index of the one identified centroid, wherein storing the index uses less number of bytes than storing the sub-vector.

Step 850 of method 800 includes storing the plurality of index maps as an assignment table to represent the plurality of nodes for the GNN computation, wherein the GNN computation comprises decoding the plurality of index maps based on the assignment table and the codebook. In some embodiments, the decoding comprises: receiving a request for a feature vector representing a graph node; obtaining the index map corresponding to the requested feature vector, wherein the index map comprises one or more indices corresponding to one or more of the plurality of centroids; obtaining the one or more centroids based on the one or more indices and the codebook; and aggregating the one or more centroids as the requested feature vector of the graph node.

In some embodiments, the method 800 further includes batching the plurality of nodes into a plurality of batches and assigning the plurality of batches into a plurality of processing units for parallel encoding, wherein the parallel encoding comprises: generating a codebook and an assignment table for each of the plurality of batches. In some embodiments, the batching comprises: batching the plurality of nodes into the plurality of batches by applying a hash function to node indices of the plurality of nodes. In some embodiments, the batching comprises: batching the plurality of nodes into the plurality of batches based on locality of each node within the graph.

Figure 9:
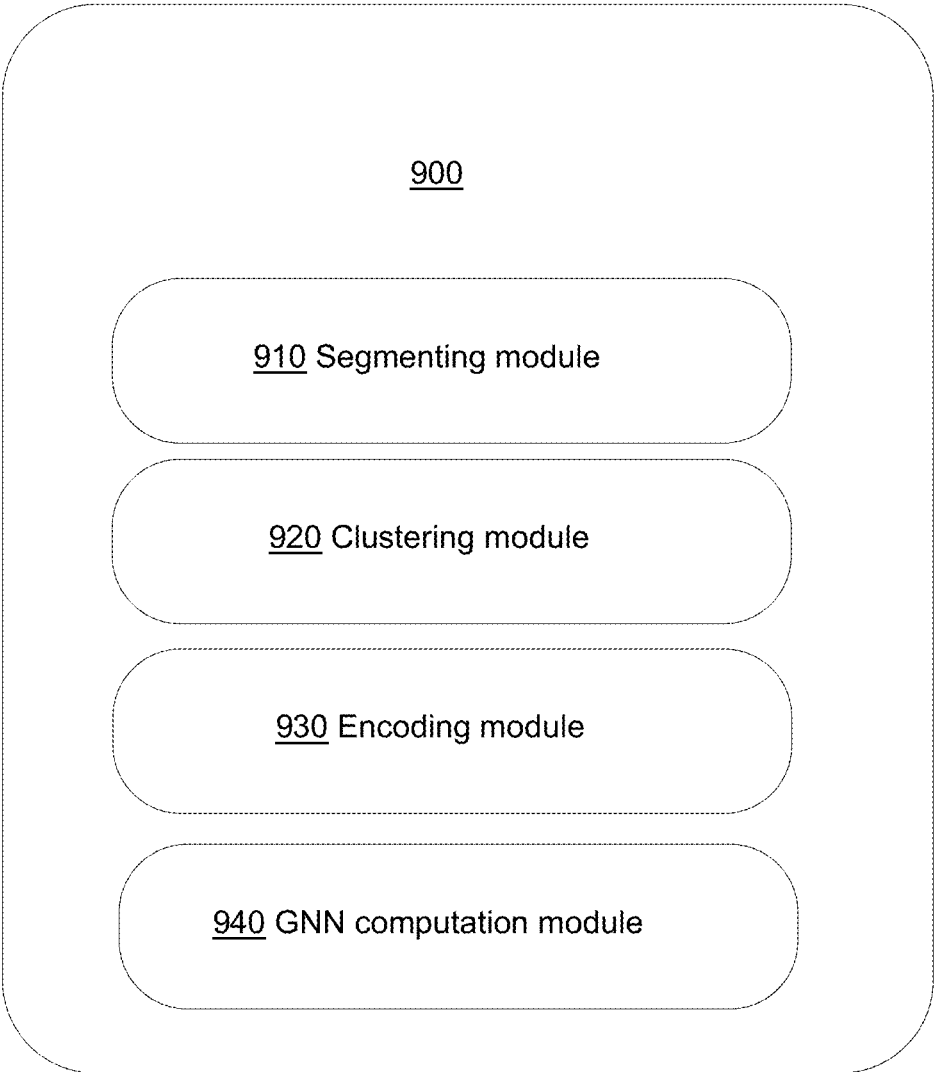
FIG. 9 illustrates a block diagram of a hardware device with efficient in-memory accumulation for spGEMM in accordance with some embodiments.

FIG. 9 illustrates a block diagram of a hardware device 900 for product quantization in GNN computation in accordance with some embodiments. The components of the hardware device 900 presented below are intended to be illustrative. Depending on the implementation, the hardware device 900 may include additional, fewer, or alternative components.

The hardware device 900 may be an example of implementing the method 800 of FIG. 8. The hardware device 900 may include one or more processors and one or more non-transitory computer-readable storage media (e.g., one or more memories) coupled to the one or more processors and configured with instructions executable by the one or more processors to cause the system or device (e.g., the processor) to perform the above-described embodiments. The hardware device 900 may include various units/modules corresponding to the instructions (e.g., software instructions). The hardware device 900 may be implemented as the GNN accelerator 230 in FIG. 1B.

In some embodiments, the hardware device 900 may include a segmenting module 910, a clustering module, an encoding module 930 and a GNN computation module 940. These modules may be implemented by the hardware devices and electronic circuits illustrated in FIGS. 1A-8.

In some embodiments, the segmenting module 910 may be configured to receive a graph comprising a plurality of nodes as an input for the GNN computation, wherein the plurality of nodes are respectively represented by a plurality of feature vectors. In some embodiments, the clustering module 920 may be configured to segment the plurality of feature vectors into a plurality of sub-vectors, group the plurality of sub-vectors into a plurality of groups of sub-vectors, perform vector clustering on each of the plurality of groups of sub-vectors to generate a plurality of centroids, and store the plurality of centroids as a codebook. In some embodiments, the encoding module 930 may be configured to encode each of the plurality of feature vectors into an index map to obtain a plurality of index maps by quantizing sub-vectors within the each feature vector based on the codebook, wherein the index map occupies a smaller memory space than the each feature vector does. In some embodiments, the GNN computation module 940 may be configured to store the plurality of index maps as an assignment table to represent the plurality of nodes for the GNN computation, wherein the GNN computation comprises decoding the plurality of index maps based on the assignment table and the codebook.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for accelerating graph neural network (GNN) computation using product quantization, comprising:

receiving, by a graph neural network (GNN) accelerator on a computing device, a graph comprising a plurality of nodes as an input for the GNN computation, wherein the plurality of nodes are respectively represented by a plurality of feature vectors;

segmenting, by the GNN accelerator, the plurality of feature vectors into a plurality of sub-vectors;

grouping, by the GNN accelerator, the plurality of sub-vectors into a plurality of groups of sub-vectors;

performing, by the GNN accelerator, vector clustering on each of the plurality of groups of sub-vectors to generate a plurality of centroids, storing, by the GNN accelerator, the plurality of centroids as a codebook;

encoding, by the GNN accelerator, each of the plurality of feature vectors into an index map to obtain a plurality of index maps by quantizing sub-vectors within the each feature vector based on the codebook, wherein the index map occupies a smaller memory space than the each feature vector does; and storing, by the GNN accelerator, the plurality of index maps as an assignment table and storing at least a portion of the codebook on an on-chip memory of the GNN accelerator to represent the plurality of nodes for the GNN computation using the GNN accelerator on the computing device, wherein storing the assignment table and the codebook saves memory space and reduces memory access frequency than directly storing the plurality of feature vectors, thereby accelerating the GNN computation, wherein the method further comprises batching the plurality of nodes into a plurality of batches and assigning the plurality of batches into a plurality of processing units, and generating the codebook and the assignment table for each of the plurality of batches.

2. The method of claim 1, wherein the segmenting the plurality of feature vectors into the plurality of sub-vectors and grouping the plurality of sub-vectors into a plurality of groups of sub-vectors comprises:

segmenting the plurality of feature vectors into the plurality of sub-vectors of a predetermined sub-vector size; and grouping the sub-vectors into the plurality of groups of sub-vectors based on an offset of each sub-vector within a corresponding feature vector.

3. The method of claim 1, prior to the segmenting the plurality of feature vectors into a plurality of sub-vectors, further comprising:

quantifying a sparsity level of the plurality of feature vectors;

determining a sub-vector size based on the sparsity level, wherein the sparsity level is inversely proportional to the sub-vector size; and segmenting the plurality of feature vectors into the plurality of sub-vectors with the determined sub-vector size.

4. The method of claim 1, wherein each of the plurality of sub-vectors comprises one sub-vector from each of the plurality of feature vectors at a same offset.

5. The method of claim 1, wherein the vector clustering comprises K-means or Support Vector Clustering (SVC).

6. The method of claim 1, wherein the performing vector clustering on each of the plurality of groups of sub-vectors to generate the plurality of centroids comprises:

within each of the plurality of groups of sub-vectors, determining multiple centroids by executing a vector clustering algorithm, wherein each of the multiple centroids comprises a vector of a same size as each of the plurality of sub-vectors.

7. The method of claim 1, wherein the storing the plurality of centroids in the codebook comprises:

indexing the plurality of centroids with a plurality of indices; and storing mappings between the plurality of indices and the plurality of centroids.

8. The method of claim 1, wherein the quantizing the sub-vectors within the each feature vector based on the codebook comprises:

for each of the sub-vectors that belongs to one of the plurality of groups of sub-vectors, determining one or more of the plurality of centroids that correspond to the one group of sub-vectors;

determining a vector distance between the sub-vector and each of the one or more centroids;

identifying one of the one or more centroids having a shortest vector distance to the sub-vector; and encoding the sub-vector using an index of the one identified centroid, wherein storing the index uses less number of bytes than storing the sub-vector.

9. The method of claim 1, wherein the GNN computation comprises:

receiving a request for a feature vector representing a graph node;

obtaining the index map corresponding to the requested feature vector, wherein the index map comprises one or more indices corresponding to one or more of the plurality of centroids;

obtaining the one or more centroids based on the one or more indices and the codebook; and aggregating the one or more centroids as the requested feature vector of the graph node.

10. The method of claim 1, wherein the performing vector clustering on each of the plurality of groups of sub-vectors comprises:

filtering out sub-vectors comprising all zeros from the plurality of sub-vectors;

excluding the sub-vectors comprising all zeros from the vector clustering;

assigning a special centroid to represent all of the sub-vectors comprising all zeros; and performing the vector clustering on the sub-vectors comprising non-zero data.

11. The method of claim 1, wherein the method further comprises:

assigning a higher priority for storing the codebook and a lower priority for storing the assignment table, and wherein the storing the codebook and the assignment table comprises:

in response to an on-chip memory being sufficient to store both the codebook and the assignment table, storing both codebook and the assignment table in the on-chip memory; and in response to the on-chip memory being insufficient to store both the codebook and the assignment table, storing the codebook in the on-chip memory and storing the assignment table in an off-chip memory.

12. The method of claim 1, wherein the batching comprises:

batching the plurality of nodes into the plurality of batches by applying a hash function to node indices of the plurality of nodes.

13. The method of claim 1, wherein the batching comprises:

batching the plurality of nodes into the plurality of batches based on locality of each node within the graph.

14. A hardware accelerator for accelerating graph neural network (GNN) computation based on product quantization, comprising:

an on-chip memory;

a graph node feature vector segmenting circuitry configured to:

receive a graph comprising a plurality of nodes as an input for the GNN computation, wherein the plurality of nodes are respectively represented by a plurality of feature vectors;

segment the plurality of feature vectors into a plurality of sub-vectors;

group the plurality of sub-vectors into a plurality of groups of sub-vectors;

a feature vector clustering circuitry configured to:

perform vector clustering on each of the plurality of groups of sub-vectors to generate a plurality of centroids;

store the plurality of centroids as a codebook;

an encoding circuitry configured to:

encode each of the plurality of feature vectors into an index map to obtain a plurality of index maps by quantizing sub-vectors within the each feature vector based on the codebook, wherein the index map occupies a smaller memory space than the each feature vector does; and store the plurality of index maps as an assignment table and at least a portion of the codebook on an on-chip memory of the hardware accelerator to represent the plurality of nodes for the GNN computation using the hardware accelerator, wherein storing the assignment table and the codebook saves memory space and reduces memory access frequency than directly storing the plurality of feature vectors, thereby accelerating the GNN computation, and the encoding circuitry is further configured to:

batch the plurality of nodes into a plurality of batches and assigning the plurality of batches into a plurality of processing units for parallel encoding, and generate the codebook and the assignment table for each of the plurality of batches.

15. The hardware accelerator of claim 14, wherein the quantizing the sub-vectors within the each feature vector based on the codebook comprises:

for each of the sub-vectors that belongs to one of the plurality of groups of sub-vectors, determining one or more of the plurality of centroids that correspond to the one group of sub-vectors;

determining a vector distance between the sub-vector and each of the one or more centroids;

identifying one of the one or more centroids having a shortest vector distance to the sub-vector; and encoding the sub-vector using an index of the one identified centroid, wherein storing the index uses less number of bytes than storing the sub-vector.

16. The hardware accelerator of claim 14, wherein the GNN computation comprises:

receiving a request for a feature vector representing a graph node;

obtaining the index map corresponding to the requested feature vector, wherein the index map comprises one or more indices corresponding to one or more of the plurality of centroids;

obtaining the one or more centroids based on the one or more indices and the codebook; and aggregating the one or more centroids as the requested feature vector of the graph node.

17. The hardware accelerator of claim 14, wherein to perform vector clustering on each of the plurality of groups of sub-vectors, the feature vector clustering circuitry is further configured to:

filter out sub-vectors comprising all zeros from the plurality of sub-vectors;

exclude the sub-vectors comprising all zeros from the vector clustering;

assign a special centroid to represent all of the sub-vectors comprising all zeros; and perform the vector clustering on the sub-vectors comprising non-zero data.

18. The hardware accelerator of claim 14, wherein the codebook has a higher priority for storage in the on-chip memory of the accelerator than the assignment table does, and the encoding circuitry is further configured to:

in response to an on-chip memory being sufficient to store both the codebook and the assignment table, store both codebook and the assignment table in the on-chip memory; and in response to the on-chip memory being insufficient to store both the codebook and the assignment table, store the codebook in the on-chip memory and store the assignment table in an off-chip memory.

* * * * *